United States Patent
Turányi et al.

(10) Patent No.: US 9,479,560 B2
(45) Date of Patent: Oct. 25, 2016

(54) NETWORK CACHE ARCHITECTURE

(75) Inventors: Zoltán Richárd Turányi, Szentendre (HU); András Császár, Budapest (HU); Ayodele Damola, Solna (SE); Stefan Hellkvist, Stockholm (SE); Attila Mihály, Dunakeszi (HU); Lars Westberg, Enköping (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 738 days.

(21) Appl. No.: 13/376,755

(22) PCT Filed: Jan. 26, 2010

(86) PCT No.: PCT/EP2010/050869
§ 371 (c)(1),
(2), (4) Date: Dec. 7, 2011

(87) PCT Pub. No.: WO2010/145853
PCT Pub. Date: Dec. 23, 2010

(65) Prior Publication Data
US 2012/0079056 A1    Mar. 29, 2012

(30) Foreign Application Priority Data
Jun. 17, 2009   (WO) ................ PCT/EP2009/057526

(51) Int. Cl.
| | | |
|---|---|---|
| G06F 15/163 | (2006.01) | |
| H04L 29/06 | (2006.01) | |
| H04L 12/24 | (2006.01) | |
| H04L 29/08 | (2006.01) | |
| H04N 21/2381 | (2011.01) | |
| H04N 21/472 | (2011.01) | |
| H04N 21/6437 | (2011.01) | |

(52) U.S. Cl.
CPC ............. *H04L 65/605* (2013.01); *H04L 12/24* (2013.01); *H04L 29/06* (2013.01); *H04L 29/08729* (2013.01); *H04L 65/608* (2013.01); *H04N 21/2381* (2013.01); *H04N 21/47202* (2013.01); *H04L 67/2819* (2013.01); *H04L 67/2842* (2013.01); *H04N 21/6437* (2013.01)

(58) Field of Classification Search
USPC ....................................................... 709/213
See application file for complete search history.

(56) References Cited

U.S. PATENT DOCUMENTS

| | | | |
|---|---|---|---|
| 5,907,678 A | | 5/1999 | Housel, III et al. |
| 6,073,129 A | * | 6/2000 | Levine et al. |
| 6,453,343 B1 | * | 9/2002 | Housel et al. ................ 709/213 |
| 6,628,620 B1 | * | 9/2003 | Cain ............................. 370/248 |

(Continued)

*Primary Examiner* — Monica C King
(74) *Attorney, Agent, or Firm* — Patents on Demand, P.A.; Brian K. Buchheit; Scott M. Garrett

(57) ABSTRACT

There is described a method and apparatus for sending data through one or more packet data networks. A stripped-down packet is sent from a packet sending node towards a cache node, the stripped down packet including in its payload a pointer to a payload data segment stored in a file at the cache node. When the stripped-down packet is received at the cache node, the pointer is used to identify the payload data segment from data stored at the cache node. The payload data segment is inserted into the stripped-down packet in place of the pointer so as to generate a full size packet, which is sent from the cache node towards a client.

9 Claims, 9 Drawing Sheets

(56) References Cited

U.S. PATENT DOCUMENTS

| | | |
|---|---|---|
| 7,054,911 B1* | 5/2006 | Lango et al. ............... 709/213 |
| 7,296,091 B1* | 11/2007 | Dutta et al. ............... 709/245 |
| 2002/0016852 A1* | 2/2002 | Nishihara ............... 709/236 |
| 2002/0023165 A1* | 2/2002 | Lahr ............... 709/231 |
| 2003/0053546 A1* | 3/2003 | Gandhi et al. ............ 375/240.27 |
| 2003/0195924 A1* | 10/2003 | Franke et al. ............... 709/203 |
| 2006/0018479 A1* | 1/2006 | Chen ............... 380/270 |
| 2007/0014404 A1* | 1/2007 | Cha ............... 380/201 |
| 2007/0266169 A1 | 11/2007 | Chen et al. |
| 2008/0256147 A1* | 10/2008 | Anand et al. ............... 707/205 |
| 2008/0320151 A1* | 12/2008 | McCanne et al. ............ 709/228 |
| 2010/0192225 A1* | 7/2010 | Ma et al. ............... 726/23 |

* cited by examiner

NETWORK CACHE ARCHITECTURE

TECHNICAL FIELD

The present invention relates to a network cache architecture. In particular, the invention relates to an application agnostic caching architecture suitable for mobile and fixed networks. The invention is applicable, but not limited to, a mechanism for caching content in a Video on Demand (VoD) system in an application agnostic way suitable for networks that have links with high bandwidth costs such as mobile networks.

BACKGROUND

Typical file caching methods include a cache receiving a file from a file server, and storing the entire file. Later when a client desires the file, instead of serving the file from the file server, the file is served from the cache. Because the cache is typically a server that is closer to the client, or has higher bandwidth than the file server, the file is served to the client quickly from the cache.

The application of typical file caching methods to files that include streaming media data, for example Video on Demand (VoD) files, can lead to new problems. VoD systems generally either stream content through a set-top box, allowing viewing in real time, or download it to a device such as a computer, digital video recorder, personal video recorder or portable media player for viewing at any time. The data delivered by networks delivering such content can run to very large amounts, and caching can be particularly useful.

This can be understood with reference to FIG. 1, which is a schematic illustration of an exemplary architecture of a VoD system with deployed caches used to reduce the load on a central long-tail server. In the example, it can be supposed that the network uses Real-Time Streaming Protocol (RTSP) streaming, where the payload is transported over the User Datagram Protocol (UDP) in Real-Time Protocol (RTP) packets, but it will be appreciated that many other applications and protocols have a similar architecture and will have similar issues.

The architecture of FIG. 1 includes a network 100 having a streaming server 101 and a number of caches 102-106. Clients 107-109 are configured to receive files and/or streaming data from the server 101 or the caches 102-106. The clients use RTSP to set up and control streams of RTP packets. This includes the negotiation of codecs, bitrates, ports etc for the resulting RTP stream. With RTSP the clients can start and stop the streaming, or fast forward or rewind the streamed media clip.

RTP packets are sent in sequence with a sequence number to tell the client the order of the packets. This infers a state into the protocol that the streaming server 101 needs to maintain and increment for each data packet it sends out. The sequence number is also used by the clients 107-109 to detect packet loss which is reported back to the streaming server using the Real-Time Transport Control Protocol (RTCP).

In order to reduce the load on the streaming server 101 and to save bandwidth in the delivery network 100, some of the content is stored in caches 102-106 closer to the end users 107-109.

The example of RTSP streaming for VoD highlights one problem with caching in general—namely that the caches 102-106 themselves need to understand the protocol and the application. The fundamental principle of a cache is that, when it takes over the role of the central server, it needs to understand the same protocol that the server understands, and know and maintain all required states etc. This applies whether the role of the central server is taken over transparently through re-routing with deep packet inspection, or through other means in the form of some redirection such as DNS based redirection or any redirection given by the protocol. If caching is to be deployed for many different applications, or if the server or protocol is enhanced or upgraded, it is also necessary to upgrade and maintain the caches. It is often the case that there is one cache per application: for example there may be a HTTP cache, a P2P cache and an RTSP cache. In some networks, such as mobile networks for example, caches can be placed in places that are hard to reach. If an upgrade of functionality is needed whenever a new application is deployed this can be costly.

Additional problems may arise if there is mobility in the network so that the client can move around during a session (such as a mobile terminal moving between base stations). Using the example above, suppose one of the clients 107 is receiving data from one of the caches 104. If the client 107 moves location so that it is now receiving data from another cache 105, the session state (in this example, the RTP packet sequence number) needs to be migrated into the new cache 105, which may or may not also include the relevant content, so that the session can continue in the new place. A great deal of application specific knowledge is therefore required in the cache implementation.

Where caching is controlled by a redirector-based system, it is possible to balance load (i.e. cache allocation and request distribution) between caches. However, this is a non-trivial issue if the caches are geographically distributed. It is also not simple in a distributed system to find the cache that has the given content, which generally requires complex solutions for synchronization.

Furthermore, in many of the solutions used today (including redirector-based solutions) there is a chance that communication is disrupted if the cache server fails. A solution that allows seamless fallback to the original communication would be desirable.

SUMMARY

It is the object of the present invention to obviate at least some of the above disadvantages.

It would be desirable to make caches "application agnostic" so that they can be used for any application. It would be desirable to be able to use the same caching infrastructure for several different applications such as RTSP streaming, and HTTP or PTP downloads. It is also desirable that no session state needs to be migrated between caches. It is further desirable to provide a fallback mechanism for situations in which a cache fails, or in which a user moves to an area unsupported by a cache.

In accordance with one aspect of the present invention there is provided a cache for use in a packet data network. The cache comprises a receiver for receiving a packet from an upstream node, a storage medium for storing cached data, and a processor operatively connected to the receiver and storage medium. The processor is arranged to identify whether the packet is a stripped-down packet in which a payload contains pointer information identifying a payload data segment. If so, the processor also determines whether the payload data segment is stored in the storage medium. If so, the processor is arranged to use the pointer information to locate and retrieve the payload data segment from the storage medium, and insert the retrieved payload data segment into the payload of the packet. The cache also includes a transmitter operatively connected to the processor for forwarding the packet towards a client.

This means that the cache can receive stripped-down packets that contain a pointer information instead of a full set of payload data. The cache can use this pointer information to re-generate full size packets with their required payload data. In one embodiment, the processor replaces the pointer information in the packet with the retrieved payload data segment. The cache therefore does not need to store application-specific or state information. Furthermore, if the client roams so that it is being supplied with data by a different cache, no state data needs to be transferred to the other cache. This greatly assists the provision of cached data to a mobile client.

If the packet is a stripped-down packet but the payload data segment is not stored in the storage medium, the cache may be configured so that the transmitter drops the packet without sending it towards the client. Instead, an error message may be sent towards the upstream node. This means that the upstream node knows that the stripped-down packets are not being repopulated, and that it must revert to sending full size packets. It also knows that it needs to re-send a full size version of the stripped-down packet which caused the cache to send the error message. This provides a fall-back mechanism if a mobile client moves from a data supply route including a cache to a data supply route not including a cache.

In order to identify whether the payload of the packet contains the pointer information, the processor may be arranged to carry out Deep Packet Inspection (DPI). Alternatively, the processor may be arranged to search a header of the packet for a marker identifying whether the payload of the packet contains the pointer information. The header may include a "fall-back" parameter which would cause an error message to be sent from a client node if the stripped-down packet reached the client node (e.g. a false source or destination port, protocol identifier, or IPv6 identifier). This fall-back parameter could be used as the marker. The processor may be arranged to remove the fall-back parameter from the packet header and replace it with a correct value retrieved from the pointer information. The processor may be arranged to test all packets received from that upstream node (e.g. by searching for the fall-back parameter in the header) to determine if they are stripped-down packets.

If the packet is not a stripped-down packet and the storage medium does not contain a data segment corresponding to a payload of the packet, the processor may be configured to retrieve the payload of the packet and save it in the storage medium. This enables the cache to be populated "on the fly" when it forwards complete packets.

The pointer information may include a file ID identifying a file stored in the storage medium containing the payload data segment, a location ID identifying the location of the data segment within the file, and a length ID identifying the length of the data segment.

In accordance with another aspect of the present invention there is provided a payload stripper unit for use in a packet data network. The payload stripper unit comprises a receiver for receiving a packet and a processor operatively connected to the receiver. The processor is arranged to remove a payload data segment from a payload of the packet and insert pointer information into the packet so as to generate a stripped-down packet. The pointer information is for enabling a cache downstream of the payload stripper unit to identify the payload data segment from the data held by the cache. A transmitter is operatively connected to the processor for forwarding the packet towards the cache.

The payload stripper unit thus enables the stripped-down packets to be sent across a part of a network (or networks) where there is low bandwidth. Full size packets can be sent as normal by a server, and intercepted by the payload stripper unit.

The payload stripper may include a storage medium, operatively connected to the processor, for storing records of data held by the cache. The processor may be arranged to identify whether the payload data segment is held by the cache, and remove the payload data segment from the packet to generate the stripped-down packet only if this is the case. If the payload data segment is not held by the cache, the payload stripper may not remove the payload data segment from the packet, and may send the full packet towards the client. This also means, that, if the client moves from a cache which does have the data to a cache which does not, the payload stripper can react to this by stopping stripping the packets.

The payload stripper may be arranged to populate the cache with data. This ensures that the payload stripper knows which data is stored by the cache, and how the pointer information should be configured to enable the cache to find the payload data when it receives the packet.

The processor may be arranged to insert a marker into a header of the packet to indicate that it contains pointer information instead of payload data. This marker may be a "fall-back" parameter as defined above, i.e. designed or chosen so that, if the stripped-down packet reaches the client node, it will cause the client node to return an error message without forwarding the stripped-down packet to a client application. Alternatively, the fall-back parameter may be in addition to the marker.

The fallback parameter may be a destination port, source port, or protocol value, or an IPv6 Destination Option with the highest order bits of its type set to either "10" or "11".

The receiver may be arranged to receive error messages from a downstream client node or cache, in response to which the processor may be configured to stop removing payload data segments from packets intended to be sent towards that client node or cache. Thus if the cache does not have the necessary data and sends an error message (as described above), the payload stripper unit reverts to sending full size packets. If a stripped-down packet finds its way through to a client node, an error message is sent because of the fall-back parameter. Again, on receipt of this error message, the payload stripper reverts to sending full size packets.

The payload stripper unit may be further arranged to combine packets from which payload data segments have been extracted to form an aggregated packet. This enables a reduction in the number of packets being sent, as well as (or instead of) a reduction in their size.

It may be that a server sends stripped-down packets. This may be seen as the payload stripper unit being located at the server, although in this case there will be no need to receive full size packets and remove the payload data. Thus in accordance with a further aspect of the present invention there is provided a server for sending data in a packet data network. The server comprises a processor operatively connected to the storage medium. The processor is arranged to generate a stripped-down packet to be sent towards a client to enable a payload data segment to be delivered to the client. The stripped-down packet includes pointer information for enabling a cache downstream of the server to identify the payload data segment from the data held by the cache. A transmitter is operatively connected to the processor for forwarding the packet towards the cache.

It will be appreciated that the optional features discussed above with reference to packet strippers may also be included with the server.

In accordance with a further aspect of the present invention there is provided a system for transmitting data through one or more packet data networks. The system comprises a packet sending node and a cache node. The packet sending node is arranged to send a stripped-down packet towards the cache node or a client node, the stripped-down packet including in its payload a pointer to a payload data segment stored in a file at the cache node. The cache node is arranged to receive the stripped-down packet, use the pointer to identify the payload data segment from data stored at the cache node, and insert the payload data segment into the stripped-down packet in place of the pointer so as to generate a full size packet. The full size packet is then towards a client.

The packet sending node may be a packet stripping node arranged to receive a full size packet containing the payload data segment, remove the payload data segment from the full size packet and replace it with the pointer to generate the stripped-down packet. Alternatively, the packet sending node may be a server.

The cache node may be configured so that, if the payload data segment is not stored therein, the stripped-down packet is dropped and an error message is returned to the packet sending node.

The packet sending node may be configured to insert a fall-back parameter into a header of the stripped-down packet. When the full size packet is generated, the cache node is configured to replace the fall-back parameter with a correct value. If the stripped-down packet reaches the client, the fall-back parameter causes the client to return an error message.

The packet data network (or networks) may include a plurality of cache nodes, each having the same data stored thereon. This means that, if a user switches end point during the lifetime of a session, no session state needs to be migrated between caches.

In accordance with another aspect of the present invention there is provided a method of sending data through one or more packet data networks. The method comprises sending a stripped-down packet from a packet sending node towards a cache node or client node. The stripped-down packet includes in its payload a pointer to a payload data segment stored in a file at the cache node. When the stripped-down packet is received at the cache node, the pointer is used to identify the payload data segment from data stored at the cache node. The payload data segment is inserted into the stripped-down packet in place of the pointer so as to generate a full size packet, which is sent from the cache node towards a client.

The packet sending node may be a packet stripping node which receives a full size packet containing the payload data segment, removes the payload data segment from the full size packet and replaces it with the pointer to generate the stripped-down packet. Alternatively, the packet sending node may be a server.

If the payload data segment is not stored in the cache node, the stripped-down packet is dropped and an error message is returned to the packet sending node.

A fall-back parameter may be inserted into a header of the stripped-down packet at the packet sending node. The fall-back parameter causes the client to return an error message if the stripped-down packet reaches the client, but is replaced with a correct value when the full size packet is generated at the cache node. The fall-back parameter may be recognized by the cache, which may return an error message if the payload data segment referred to by the pointer in the stripped-down packet is not cached.

It will be appreciated that the various elements described above may not necessarily all be found within the same network. The server, payload stripper (if present), cache and client may all be within the same network, but may also be found in different networks. In particular it is often the case that the server and client are in different networks.

The present invention also provides a program adapted to be executed on a cache in a packet data network. The program is operable to identify whether a payload of a packet received by the cache contains pointer information identifying a payload data segment stored by the cache and, if so, use the pointer information to locate and retrieve the payload data segment, insert the retrieved payload data segment into the payload of the packet, and forward the packet towards a client.

The present invention also provides a program adapted to be executed on a packet stripper unit in a packet data network. The program is operable to remove a payload data segment from the packet so as to generate a stripped-down packet, and insert pointer information into the stripped-down packet, which will enable a cache downstream of the packet stripper to identify the payload data segment from the data held by the cache. The program is further operable to forward the stripped-down packet towards the cache.

In accordance with another aspect of the present invention there is provided a program adapted to be executed on a server in a packet data network. The program is operable to generate a stripped-down packet to be sent towards a client to enable a payload data segment to be delivered to the client. The stripped-down packet includes pointer information for enabling a cache downstream of the server to identify the payload data segment from the data held by the cache. The program is further operable to forward the stripped-down packet towards the cache.

The invention also includes a carrier medium carrying any of the programs described above.

Thus, for content which is known to be cached downstream, packets are still sent normally, but containing pointer information instead of at least some of the data payload. It is up to the cache further downstream to fill in the true payload into the packets as the packets arrive at the cache and continue to their final destination. The session state and application logic can still be kept centrally, and the cache can be made to work exactly the same way, regardless of which application it is serving. The cache can provide storage close to the end users without knowing anything about the application—if it is streaming of video, HTTP download or P2P traffic.

By including "fallback" parameters in the headers of stripped-down packets, it is possible to provide feedback to the content servers in the event that the stripped-down packets are not regenerated into full-size packets by on-route caches. Similarly, if the on-route caches do not have the data required, they can inform the content servers of this fact. This greatly assists mobility of users, for example if a client node moves from an area where a cache is present to an area where a cache is not. Similarly, if a cache detects that it is forwarding full size packets where it holds content in its storage medium, it can inform the content server of this fact so that it can switch to sending stripped-down packets.

BRIEF DESCRIPTION OF THE DRAWINGS

Some preferred embodiments will now be described by way of example only and with reference to the accompanying drawings, in which.

DETAILED DESCRIPTION

Figure 1:
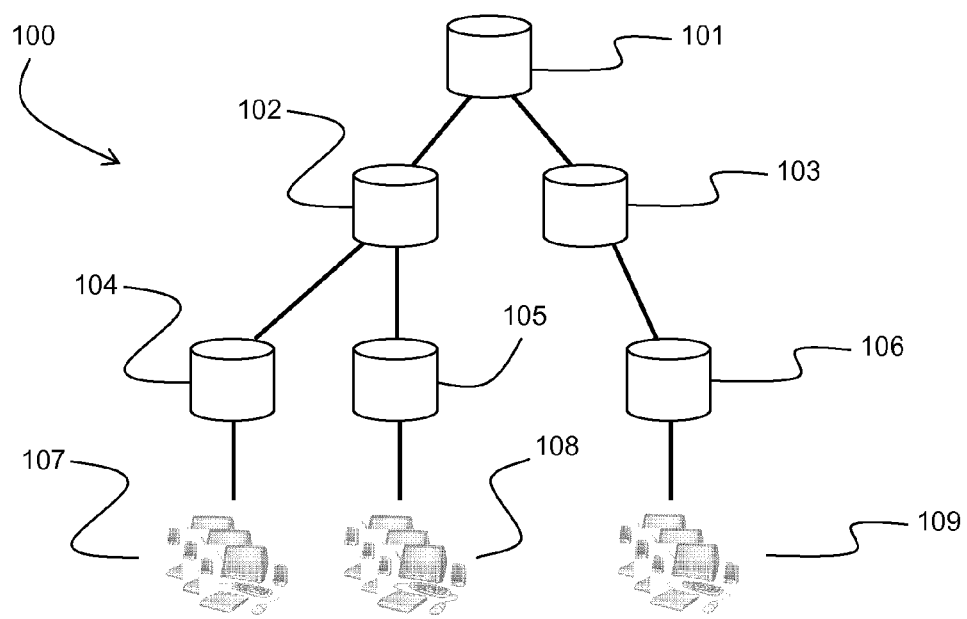
FIG. 1 is a schematic illustration of a network architecture.
Figure 2:
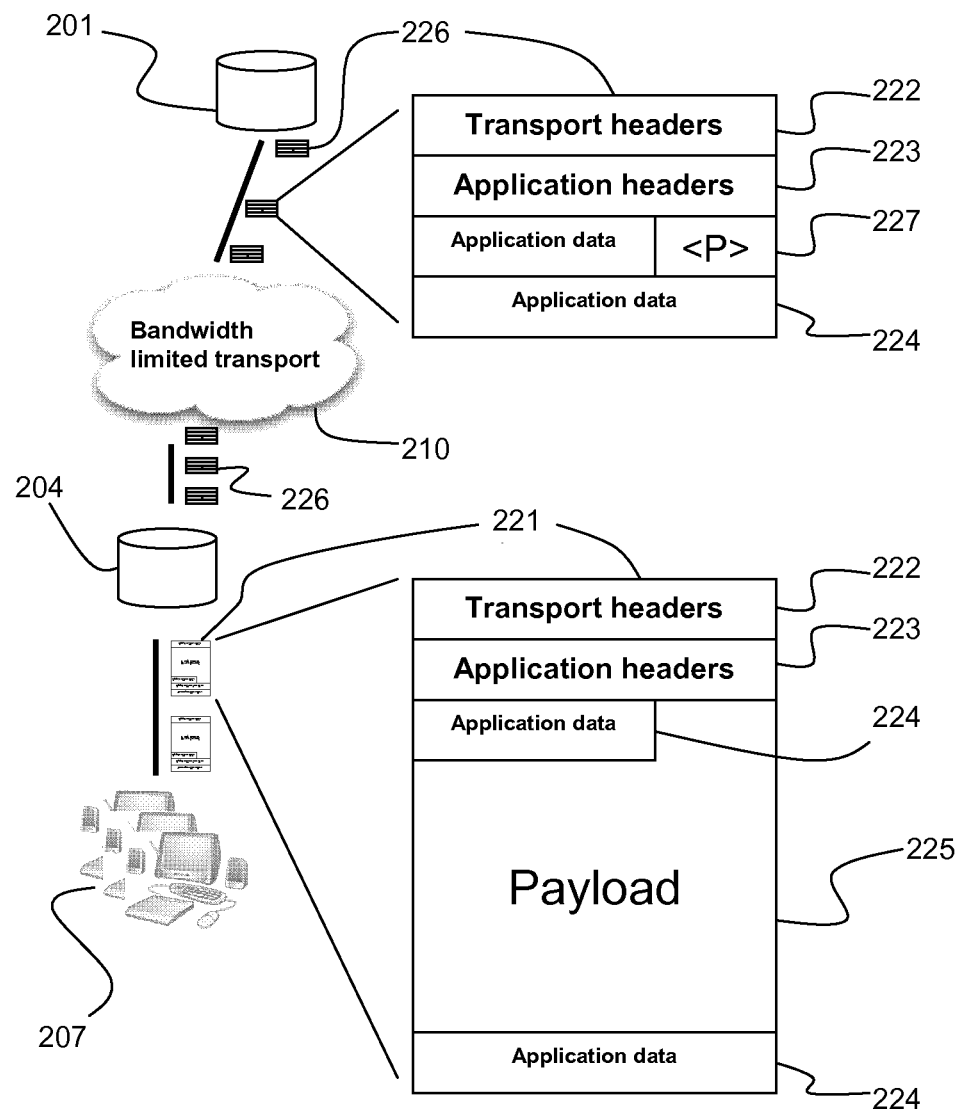
FIG. 2 is a schematic illustration of part of a network including a cache.

FIG. 2 is a schematic illustration of a network architecture, showing a content server 201, cache 204 and client 207. Part of the network 210 is bandwidth limited, so it is desirable to avoid sending large amounts of data across this part.

The network is used to send packets 221 to the client 207. Each packet 221 received by the client 207 should include transport and application headers 222, 223, application data 224 such as state information, and a data payload 225. These packets are large and require a lot of bandwidth.

In order not to overload the bandwidth limited transport 210, the content server 201 sends reduced size packets 226 towards the cache 204. This can only be done if the content server 201 knows that the content is held in the cache 204. In the reduced size packets 226 the data payload 225 (all data content excluding application headers and state) has been replaced by a simple pointer <P> 227 into a file held at the cache 204. The pointer 227 contains the following information:
- a file ID so that the cache can identify the file in which the correct content is held by the cache;
- a location within the file of the correct data payload for that packet;
- the length of the resulting data segment the cache should retrieve from the file when processing the packet.

Application specific logic such as headers 222, 223 and states 224 (in the example with RTP packets this would be RTP headers and the sequence number) is kept in place in the reduced size packets 226. The only thing that is different is that the data payload 225 (which is stored in the cache) is not sent from the server. The reduced size packets 226 can therefore be thought of as "stripped-down" packets 226.

When such a stripped-down packet 226 is received by the cache 204, a "payload inserter" function in the cache will go through the packet searching for a pointer <P>. When the pointer 227 is found, the payload inserter will identify the cached file referred to in the pointer, and identify the location in the file and the amount of data referred to by the pointer. This data is copied from the cached file and inserted into the stripped-down packet 226 as payload data 225 in place of the pointer 227 so as to generate a full size packet 221. The full size packet 221 is then delivered onwards towards the client 207. The cache storage medium, where the file is stored, may be local storage such as RAM, flash memory or hard drive, or more distributed local storage such as one provided by a distributed caching hierarchy.

Thus the cache 204 does not need to know anything about the type of data or application. It simply needs to replace a pointer with a payload.

Some applications may require application state data to be mixed with the payload data. In this situation stripped-down packets may contain more than one pointer, interspersed between application state data.

It will be appreciated that, in order for the content server 201 (the streaming server in the case of VoD over RTSP/RTP) to know when to send the stripped-down packets, it needs to know what is cached further down into the network. One way of enabling this is to ensure that the server 201 has control over the information stored by the cache (or caches) 204. The server 201 may instruct the caches 204 what to store, and maintain a list of content stored in the caches 204. The transfer of data from the server to the caches could be at regular intervals, such as every night. This also ensures that the server 201 has the necessary information about file ID and data location to insert the correct pointers into the stripped-down packets.

As an alternative, the cache 204 may maintain its content without control from the server 201. If a request for content from the client 207 passes through the cache 204, the cache may recognise this and mark the request to identify whether or not it has the requested content stored, for example using a header field in the request packet header, before passing it on. When the server 201 receives the request it knows from the marked request whether or not the cache has the content stored and therefore whether it should send full size or stripped-down packets.

In some situations it may not be desirable or possible for a server to control the data held by caches further downstream. In these situations, an additional "payload stripper" node may also be used. The operation of such a node may be understood with reference to FIG. 3, which is a schematic illustration of an alternative network architecture, showing a content server 301, cache 204, client 207 and payload stripper 330.

In this situation, the client 207 may request content from the server 301 in the usual way. The server sends full size packets 321 back towards the client, whether or not this content is cached elsewhere in the network. These packets contain transport and application headers 222, 223, application data 224 and a payload 225 so that they are in a suitable form for delivery to the client 207.

The payload stripper 330 intercepts each full size packet 321, removes the payload 225 and replaces it with a pointer <P> 227, in the same manner as the server 201 described above with reference to FIG. 2. The difference is that the payload is removed by the payload stripper 330 rather than the server 301. Each stripped-down packet 226 is forwarded towards the cache 204 across the bandwidth limited transport 210.

The payload inserter function in the cache 204 reconstructs full size packets 221 as described above with reference to FIG. 2, and forwards them towards the client 207.

Thus the arrangement can be seen to have two constituent parts either side of the bandwidth limited transport 210: the payload stripper 330 and the payload inserter in the cache 204. The payload stripper removes the payload 225 from full size packets and replaces it with a pointer 227 to generate stripped-down packets; and the payload inserter in the cache replaces the pointer 227 with payload data 225 retrieved from a stored file. The payload stripper 330 controls the files stored at the cache 204. This means that the server 301 does not even need to know that the data is cached.

Figure 3:
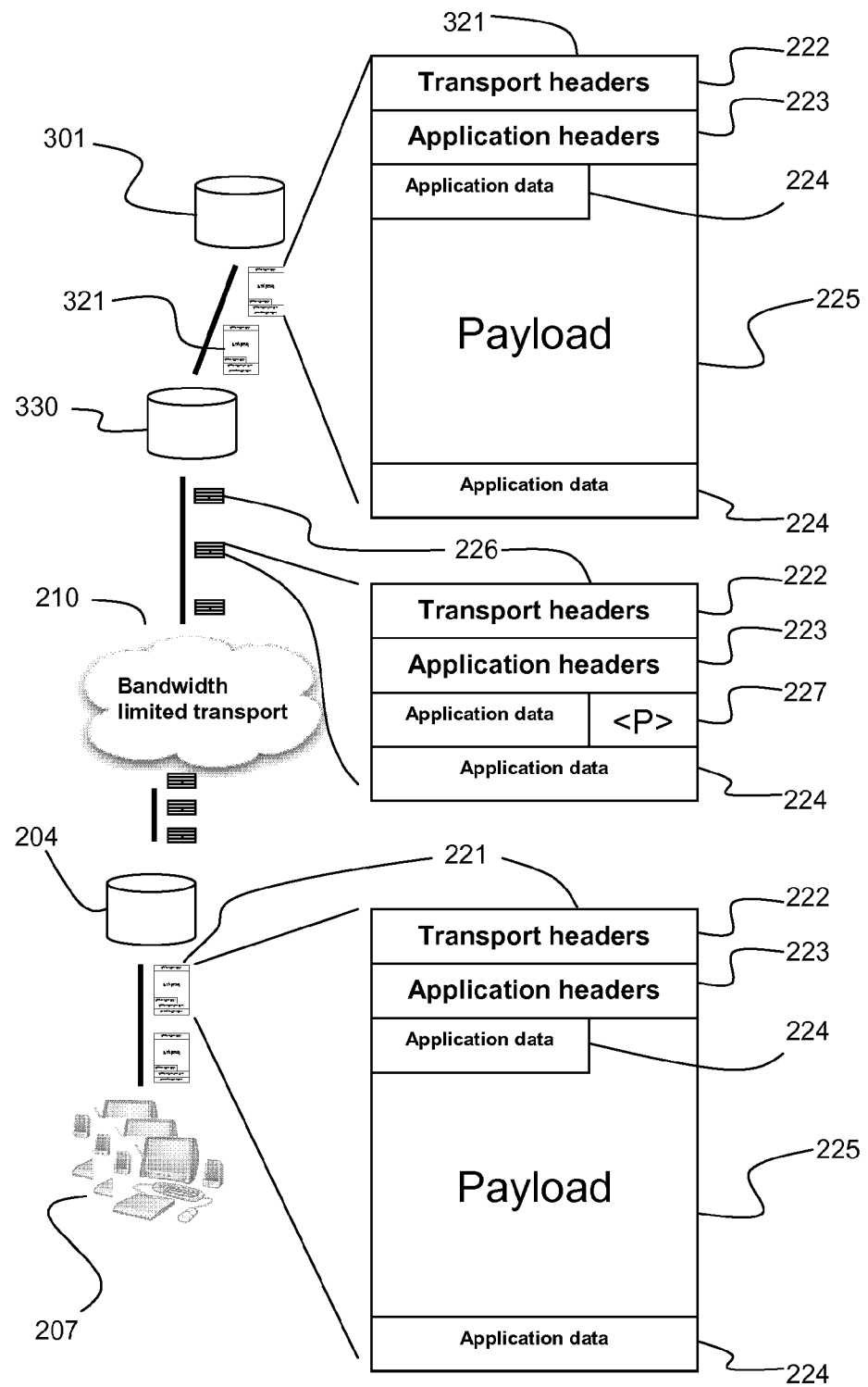
FIG. 3 is a schematic illustration of part of a network including a cache and payload stripper.

The arrangement of FIG. 2 may also be seen as a version of the arrangement of FIG. 3 in which the payload stripper 330 is collocated with the server 301.

The manner in which content is allocated to caches 204, 304 (where there are many caches in a network) is worthy of comment. In one scheme different content may be allocated to different caches. This makes it possible to tailor the caches for local demand.

In an alternative scheme, all the caches in a network (or in a particular area) may be populated with the same content. This is useful in situations such as a mobile system where a user may switch from end point to end point (e.g. between different base stations in a mobile network), since it makes it possible to continue an ongoing session elsewhere. If all of the caches have the same file, the client can move from cache to cache without the need to pass application or state information between the caches. The case where caches all have the same content is less complex by nature and, as mentioned, is particularly useful in mobile networks.

It will be appreciated that the cache 204, 304 will need to be able to identify that it is receiving stripped-down packets 226, and that it therefore needs to find the relevant data and insert it into these packets. One possible approach is for the cache to carry out Deep Packet Inspection (DPI) to identify which traffic needs to be processed in this way. Alternatively, stripped-down packets 226 could be marked in some way to identify to the cache that it is necessary to insert the data payload. This could be achieved by inserting a marker into the header of the packet. This is discussed in more detail below.

In a mobile network where data is transported in secured tunnels further functions may be needed to mark which packets should be processed by the cache. The actual processing, where pointers are replaced with content, although simple in nature, will be costly due to the sheer number of packets.

For example, a distinct feature of 3GPP System Architecture Evolution (SAE)/Evolved Packet Script (EPS) networks is the fact that traffic from a Public Data Network (PDN) gateway to a mobile terminal (UE) via an eNodeB is sent over secure tunnels. For access to the Evolved Packet Core (EPC) in Evolved UMTS Terrestrial Radio Access Networks (E-UTRAN), the PDN connectivity service is provided by an EPS bearer for the S5/S8 interfaces and the General Packet Radio Service (GPRS) Tunnelling Protocol (GTP) is used.

Each GTP user data packet carries a value, known as the Tunnel Endpoint Identifier (TEID), that identifies which bearer the packet belongs to. The value is selected by the entity terminating the GTP tunnel, and is communicated to the tunnel ingress point at bearer setup and handover. Usually a new bearer to the same terminal is established when different QoS treatment is needed.

If DPI is to be carried out, the packets destined for the UE (client) must be 're-routed' from their respective GTP tunnel and delivered to a DPI functionality which identifies those packets with a pointer instead of a data payload. These packets are then forwarded to the cache for payload population.

The application agnostic caching solution could be implemented on two levels; at the Serving Gateway (S-GW) or at the eNodeB. In both cases, for the correct tunnel to be selected, the TEID carrying the traffic to the UE should be signalled to the S-GW or eNodeB so that these nodes could then re-route the right traffic flow to the DPI function. The signalling is performed from the PDN GW which is aware of the packet flows which need payload population as well as the PDP context (TEID). After the payload has been inserted into the packets by the cache, the traffic needs to be inserted back into the same tunnel, again using the TEID.

It will be appreciated that the description above is predicated on the fact that an operational cache exists on the path followed by the data packets, and that the necessary data is present in the cache. If this is not the case, some fall-back mechanism will be required to deal with the fact that cached data is not available. A suitable fall-back mechanism would have three chief components:

1. If a cache 204 receives a stripped-down (stripped-down) packet 226 but does not have the content indicated by the pointer <P> 227 contained in the packet, it drops the packet and sends a message to the content server 201 (or packet stripper 330), indicating the error. The content server 201 or packet stripper 330 then switches back to full payload mode. In addition, it may instruct the cache 204 in a reply to start caching the content passing through.
2. Stripped down packets are deliberately formatted erroneously so that, if they reach the terminal 207 without going through a cache (which would replace the pointer <P> with content), the terminal 207 generates an Internet Control Message Protocol (ICMP) reply addressed to the content server 201. This indicates to the content server 201 that there is no cache on the path to the user, and can also act as an instruction to the content server 201 to switch to full payload mode.
3. Conversely if the content server 201 is sending full payload packets and there is a cache on-path, it can also detect the content and indicate its presence to the content server. This allows the content server to switch to stripped payload mode.

These features enable turning caching on and off during transmission and hence support terminal mobility, with automatic migration between caches and regions with and without cache support. They will be explained in more detail with reference to FIGS. 4 to 7.

Figure 4:
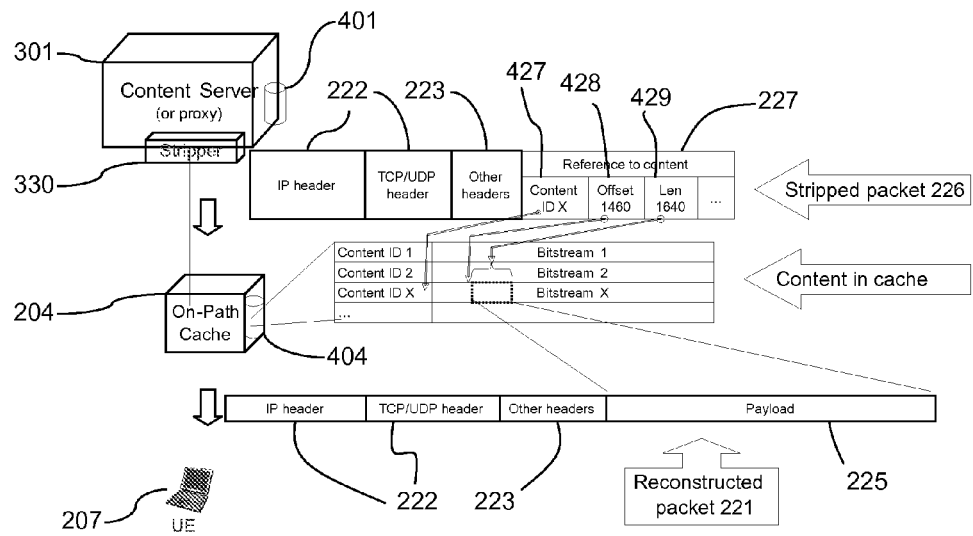
FIG. 4 is a schematic illustration of the reconstruction of a packet.

FIG. 4 is an illustration of the packet stripping and reconstitution mechanism described above. The behaviour is shown again to assist in understanding how the fallback mechanisms operate. FIG. 4 illustrates a content server 301 (having a storage unit 401) and packet stripper 330 from which stripped packets 226 are sent towards a client 207. A cache 204 is associated with a storage unit 404 in which the cached data is stored. As can be seen in FIG. 4 and previously discussed, a stripped packet 226 contains a pointer 227 including a file ID 427, location within the file 428 and length of data segment 429, that point to the content in the cache storage unit 404. The packets include transport headers 222 and application headers 223.

There are three requirements for fallback that stripping must fulfil:
1. Stripped packets shall be formatted such that, if the client 207 receives a stripped packet 226 that was not processed by a cache 204 (i.e. the packet is erroneous from the destination's perspective), then
   a. the client 207 shall discard it in such a way that preferably the packet does not reach the application AND
   b. the client 207 shall report the error in an ICMP error message. This allows the stripper 330 to detect that there is no cache 204 on-path and revert to sending full payload packets 221. Preferably, this error reporting should also happen when there is a Network Address Translation (NAT) between the stripper 330 and the destination.
2. Stripped packets 226 should be formatted such that they are readily recognized by caches 330 as stripped packets.
3. Stripped packets 226 should be forwarded by routers and firewalls without problem.

Various alternatives are available to achieve these goals.

In a first alternative, the packet stripper 330 changes the destination port to a value that is not likely to be used by the client terminal 207. Possible ports include, for example, the echo port (7) or a port registered with routing services, such as BGP or BGMP. The UDP and TCP checksum is appropriately modified to fit the new packet, so that it actually reaches the code in the terminal that generates the reply. In the echo port is used the reply can be a well formed UDP packet, if echo service is on (otherwise the reply is an ICMP "Port unreachable" message). When the stripped packet 226 is received by the cache, the correct port is re-inserted into the header of the reconstituted packet 221.

A variation of this alternative is that the stripper 330 originally sends a stripped ICMP Echo Request (Ping) message. This is formatted such that the caches 204 recognize it as a stripped packet based on the content of its payload. If this message reaches the client 207 without passing through a cache, it will be answered as usual with an ICMP Echo Reply. The advantage compared to using the UDP Echo port is that the UDP echo service is generally switched off in client systems, in which case no answer would be received by the stripper 330. The payload of the ICMP Echo message must contain the IP/UDP/TCP header information 222 the cache should substitute when converting the stripped packet to a full one.

In a second alternative, the stripper changes the source port of the packet. This works primarily with TCP, in which case the change of the source port indicates an invalid TCP connection that would probably trigger a TCP RST packet if the stripped packet 226 was received by the client 207. With UDP, clients typically accept packets from any source port. The TCP or UDP checksum must again be modified to fit the new packet, as described for the alternative above.

In a third alternative, the stripper 330 changes the protocol number to an unused value. This will trigger a "Protocol Unreachable" ICMP response from the client 207 if the stripped packet 226 reaches it. This has the benefit that there is no need to recalculate a TCP or UDP checksum, which can therefore protect the payload end-to-end. According to standard behaviour the ICMP response quotes the full original packet, which could be used by the server to ease the server's task on identifying what should be resent to whom with full payload.

Figure 5:
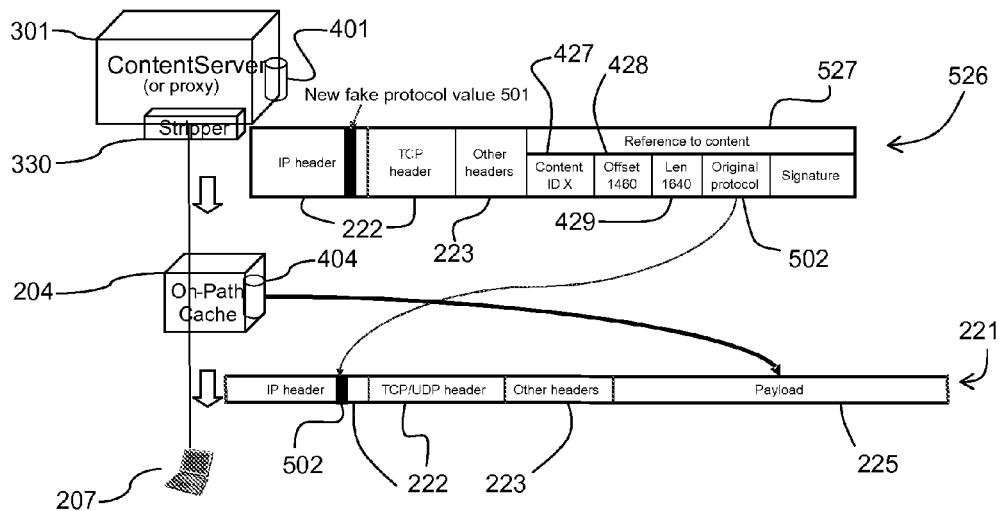
FIG. 5 is a schematic illustration of the reconstruction of a packet from a stripped-down packet with a fake protocol value.
Figure 6:
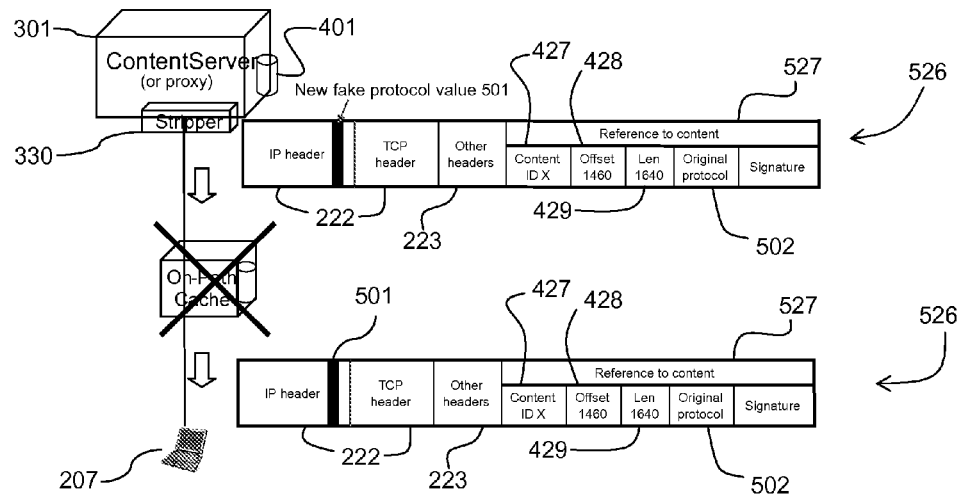
FIG. 6 is a schematic illustration of a stripped-down packet with fake protocol value being forwarded to a client.
Figure 7:
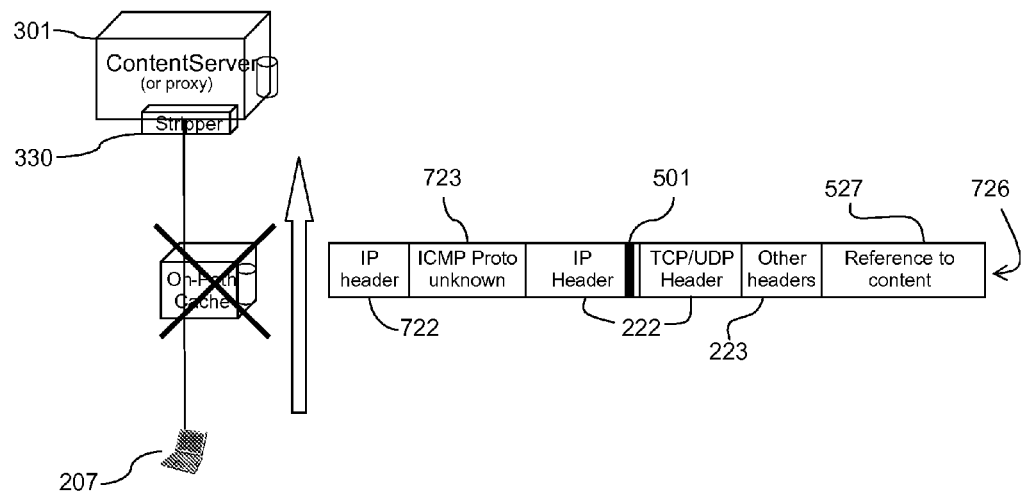
FIG. 7 is a schematic illustration of an ICMP error message returned by a client upon receipt of a stripped-down packet.

Illustrations of the third alternative with both functional and non-functional/non-existent cache, respectively, are shown in FIGS. 5, 6 and 7.

FIG. 5 illustrates a stripped-down packet 526 sent from a stripper 330 towards a client 207. The stripped-down packet 526 is the same as the packet 226 shown in FIGS. 2-4, except that a fake protocol value 501 is inserted into the transport header 222. In addition, the original protocol value 502 is inserted into the pointer 527 alongside the File ID 427, location within the file 428 and length of data segment 429. When the cache 204 receives the stripped-down packet 526 and reconstitutes it to form a full packet 221, the fake protocol value 501 is removed from the transport header and replaced by the original protocol value 502 contained in the pointer 527.

FIG. 6 illustrates what happens if the on-path cache 204 is not operational, or not even present on the path. In this case, the stripped-down packet 527 goes right through to the client 207. The fake protocol value 501 is still included in the transport header 222, and this prompts a "Protocol Unreachable" ICMP response 726 from the client 207 towards the stripper 330, as shown in FIG. 7. The ICMP response 726 includes the original packet, together with a new IP header 722 and a "protocol unknown" field 723.

The Total length field of IPv4 needs to be adjusted according to the new size of the packet and the IP header checksum re-calculated as appropriate. In any of the above alternatives the value that has been changed must be also stored in the reference inside the stripped packet in order to enable restoration to its original value by an application-agnostic cache 204.

The ICMP messages 726 sent by the client 206 in response to a stripped packet will contain the IP address of the destination (as part of the quoted packet). This allows the stripper/server 330/201 to switch to full payload mode for all transfers to this IP address.

It will be noted that packets changed as above will not pass through NATs. However, if the NAT sends an ICMP response instead of the end-host, that is enough to put the stripper/server into full payload mode.

A fourth alternative uses the Destination Options extension header in IPv6 (described in RFC2460). Extension headers are not examined or processed by any node along a packet's delivery path, until the packet reaches the node identified in the Destination Address field of the IPv6 header. The sequence of options must be processed strictly in the order they appear in the header: a receiver must not, for example, scan through the header looking for a particular kind of option and process that option prior to processing all preceding ones.

The Option Type identifiers are internally encoded such that their highest-order two bits specify the action that must be taken if the processing IPv6 node does not recognize the Option Type:
- 00—skip over this option and continue processing the header.
- 01—discard the packet.
- 10—discard the packet and, regardless of whether or not the packet's Destination Address was a multicast address, send an ICMP Parameter Problem, Code 2, message to the packet's Source Address, pointing to the unrecognized Option Type.
- 11—discard the packet and, only if the packet's Destination Address was not a multicast address, send an ICMP Parameter Problem, Code 2, message to the packet's Source Address, pointing to the unrecognized Option Type.

Therefore option 10 or 11 should be inserted into the IPv6 header of a stripped-down packet. If such a stripped-down packet is received by the client 207 It will discard the packet and return an ICMP message.

The cache 204 en route may remove this option from the extension header, or alternatively set the value to 00.

As discussed above, caches 204 need to recognize stripped traffic in order to be able to restore them to full payload. This can be done depending on which stripping alternative is used above. In any case the IP address of the stripper 330 (or content server 201) can be programmed into caches, so that any packet coming from such an address can be considered for inspection. In the case of the first three alternatives above the new destination port, source port or protocol number (respectively) can also be watched along with the source IP address. Such an ACL is easy to form and is usually supported by networking equipment.

When a cache 204 receives a packet matching the description above, it checks if it is really a stripped packet or not. The cache 204 looks for the reference at the end of the packet. A simple checksum in the short reference can help recognition. Also, an unrecognized content-ID or invalid offset or length can signal a non-stripped packet. Packets that turn out to be non stripped packets are forwarded silently.

For stripped packets the cache 204 determines if it has the content data required by the packet. If so, it removes the reference, inserts the payload, restores changed TCP/UDP/IP header values, recalculates checksums and sends the packet.

If the cache does not have access to the content, it drops the packet. Then it sends a signalling message to the stripper 330 (or content server 201) quoting the reference and indicating that there is a cache on-path, but it does not have the content. The stripper/server 330/201 switches to full payload mode and re-sends this fragment. In its response, the stripper/server 330/201 may instruct the cache to add this content to its storage unit 404. The cache can take unilateral action on caching, as well. This way cache management can be either centralized or distributed.

It will be appreciated that the cache can also send such a message if it did have access to the required piece of content, but it sees that it does not have all of the content and in the near future it will run out of existing parts.

It will be noted that caches do not need to keep track of individual users, merely the content. It will further be noted that caches need not be aware of the application delivering the content either. In addition, caches have full usage information of cached data and therefore can manage their storage efficiently, while at the same time accept hints on content that is expected to be popular in the near future.

If a client terminal 207 moves, it is possible that the cache 204 serving it will no longer be on the path. The terminal 207 may move to a different cache or to a segment where there is no cache. Similarly, it is possible that a terminal 207 which had not been covered by a cache has moved to a new location where there is a cache. Packet transmission can still be managed under these circumstances, as follows.

If a terminal moves from under one cache to another, the new cache will detect the first stripped packet and act on it. If the new cache has the content, then no disruption happens. If it does not have the content it will signal to the content server (as described above), which will switch to full payload mode. This way one round-trip of data may have to be re-sent. The old cache will no longer serve this terminal, but it needs to free no state.

If the terminal moves from under a cache to a segment without cache support, it will receive stripped packets directly and will respond with ICMP errors. The application within the terminal is not notified. The server will immediately switch to full payload mode and transmission is resumed with a loss of a round-trip worth of packets.

If the terminal moves from a region with no caches to under a cache, the new cache will have to recognize full payload traffic. To this end a list of content servers and server ports may be configured in each cache. If such packets are received that are not stripped packets, the cache shall forward them, but at the same time signal its presence to the server. The server can then switch to stripped mode or reply with the content-ID of the flow. Then the cache can decide if it signals again for switching to stripped mode (if it has the content) or not.

It will be noted that the above mechanisms are useful in the case of a rerouting event that happens in response to a network failure, as well as terminal mobility.

It will also be noted that the method works in conjunction with mobility protocols. The cache merely needs to look into GTP, PMIP or CMIP tunnels; the rest of the operation remains the same. This allows placing such caches in radio base stations or anywhere within a RAN or aggregation network on the path between the base station and the gateway. However, if tunnels are secured (e.g. using security gateways) then the cache can only be placed in the base station, since the base station can decrypt the received tunnelled packets.

The above discussion touches on one situation in which caching may be useful, but it will be appreciated that there are many other cases where the same principles may be applied. For example, similar caching processes are applicable for VoD using RTP over UDP and HTTP over TCP. Furthermore, the processes can be used for 2G and 3G networks in addition to LTE.

In addition, it will be appreciated that, although the system described above as advantages for use in mobile networks, it can also be used in fixed networks and cable networks. Furthermore, the above discussion is focussed on a network architecture in which all of the nodes (server 201, 301, payload stripper 330, cache 204, client 207) are shown as being located in the same network. It will be appreciated that this is often not the case. Caches are particularly useful in a network architecture in which the server is in one network and the client in another. It will be appreciated that this makes no difference to the operation of the system described above.

Figure 8:
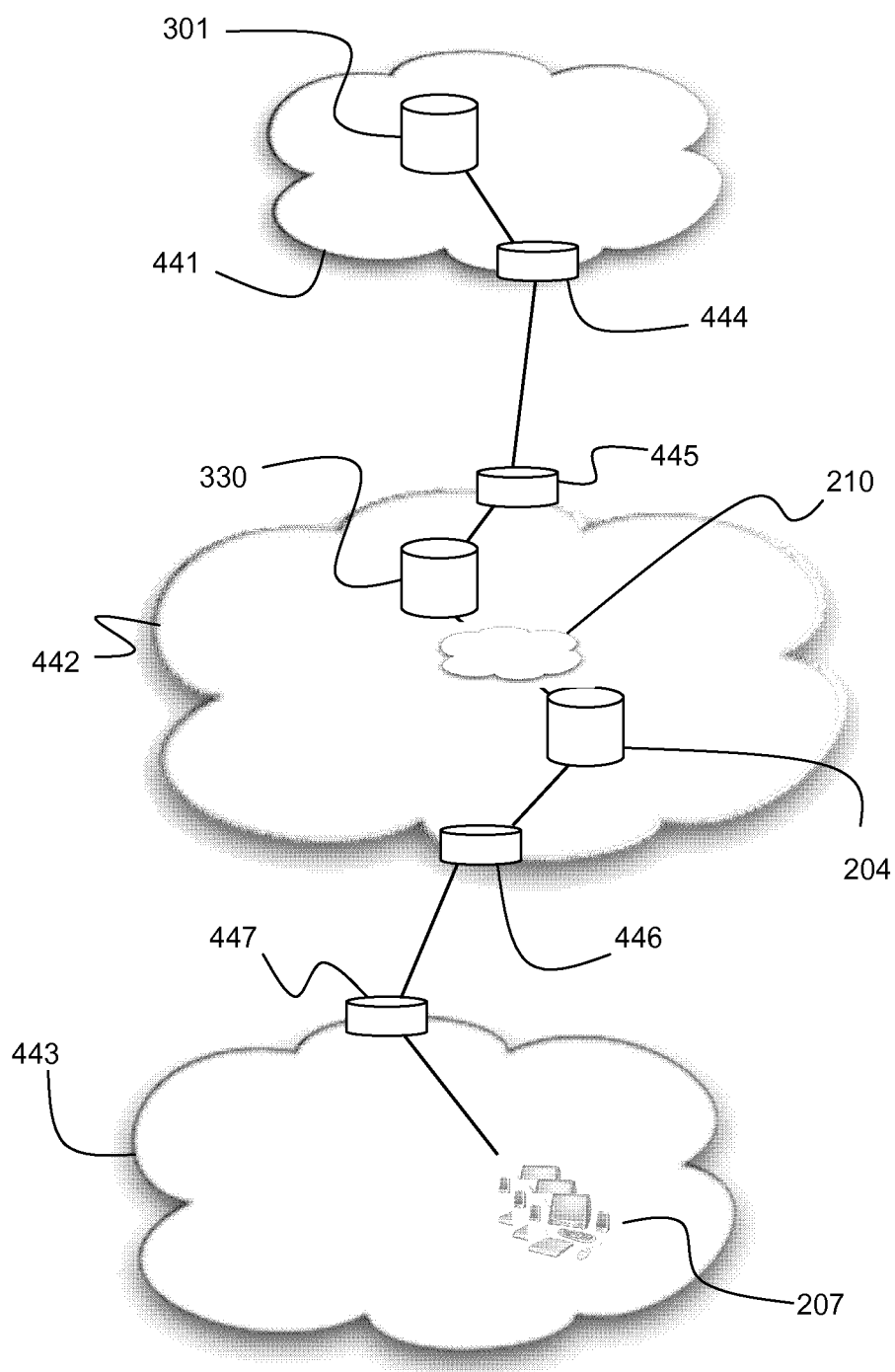
FIG. 8 is a schematic illustration of a server, payload stripper, cache and client spread across multiple networks.

For example, FIG. 8 illustrates an arrangement in which a server 301 (similar to that shown in FIG. 3) is located in a first network 441. The client is located in another network 443. Packets sent from the server 301 to the client pass through a core IP network 442 via routers 444, 445, 446, 447. If part of the core IP network 442 has a region of low bandwidth 210, the core IP network includes a payload stripper 330 and cache 204 which operate as described above with reference to FIGS. 3 to 7. Different architectures may also be envisaged.

It will be appreciated that, depending on the network in which caching is employed and the underlying physical layer of that network, the number of packets transmitted might be as important (or more important) than their size. The discussion above is focussed on reducing the amount of data that is sent by decreasing the size of the payload in packets. However, the system can also be used to reduce the number of packets.

In order to implement a reduction in the number of packets, a group of stripped-down packets can be sent together in one "aggregated" packet. Since the payload of each stripped-down packet is extremely small (containing only a pointer), it is possible, for instance, to send packets together three at a time, or aggregate any number depending on how much delay can be accepted and how much packet loss is apparent in the network. This can be done in several ways.

In FIG. 3, packets flowing from the payload stripper 330 are to the cache 204 shown exclusively as stripped-down packets 226. In a more sophisticated arrangement, packets travelling between the payload stripper 330 and the cache 204 could have a special format that essentially encodes packets in one of two forms:

Type 1 packets (simple packets) correspond to the stripped-down packets 226 shown in FIG. 3, in which the payload of the packet consists of application data 224 and payload pointer(s) 227.

Figure 9:
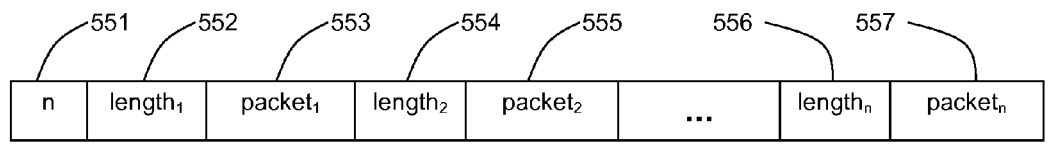
FIG. 9 is an illustration of the contents of an aggregated packet.

Type 2 packets (aggregated packets) are more complex. These packets contain a list of simple packets held within them. It is possible to imagine a recursive structure in which aggregated packets are themselves further combined to form "super-aggregated" packets, although for all practical reasons there is likely to be no reason to have type 2 packets contained inside another type 2 packet. There are many ways to implement the encoding of this format, and one example is provided in FIG. 9, which illustrates a type 2 packet 550. The packet contains a field 551 indicating how many simple packets are contained in the current aggregated packet (n). The next field 552 contains the length ($length_1$) of a simple packet ($packet_1$), and this is followed by the packet 553 itself. This is repeated for each packet, with the $length_2$ 554 of $packet_2$ 555 preceding the packet itself, up to the $length_n$ 556 of $packet_n$ 557.

A type 1 packet could be defined in the same way having n=1. The packet could also be encoded without the need for a separate length field 552, 554, 556 for each simple packet 553, 555, 557 if the length of a packet can be easily obtained from the packet itself.

As will be appreciated, this format is just one example. The format can be optimized for each deployment depending on the underlying network. There may or may not be a need to aggregate the packets. In some cases one might need lots of meta information for each packet that is part of an aggregate. The important feature is that the formats are recognised by both the payload stripper 330 and the cache 204 so that they are in synch when it comes to encoding and decoding of packets. This may also be integrated with the fallback mechanism described above, since the header of the aggregated packet can contain a fake destination port/source port/protocol value/IPv6 option as before, so that the client returns an ICMP message if it receives the aggregated packet in error.

Figure 10:
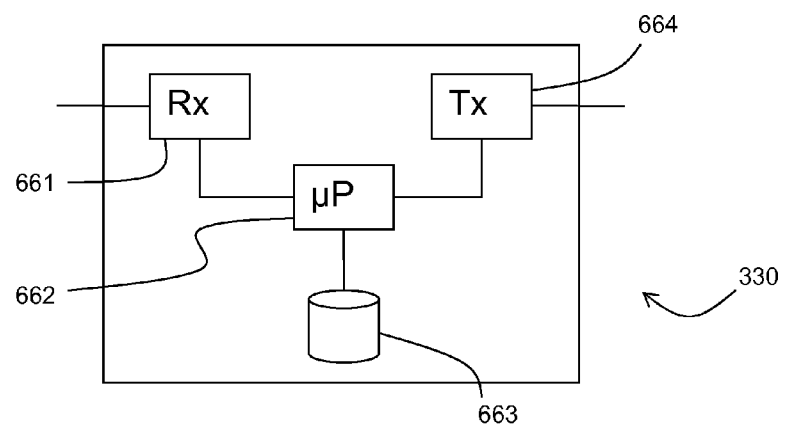
FIG. 10 is a schematic illustration of a payload stripper.

FIG. 10 is a schematic illustration of a payload stripper unit 330. The payload stripper 330 includes a receiver 661 for receiving full size packets from a server. The packets are processed by a processor 662 which removes the payload of each packet, and replaces it by a pointer to a location in a file held by a cache 204 (as shown in FIG. 3). A storage medium 663 may contain records of the files held by the cache to enable the processor 662 to determine the information which should be encoded in the pointer. A transmitter forwards the packets towards a cache.

Figure 11:
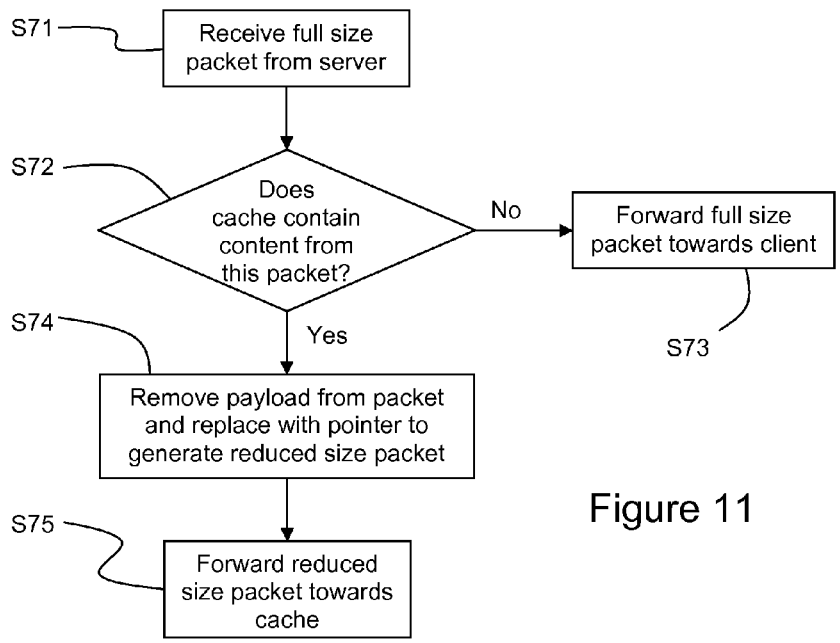
FIG. 11 is a flow chart illustrating actions carried out by a payload stripper.

FIG. 11 is a flow diagram illustrating how a packet is treated by the payload stripper 330.

S71: A full size packet is received by the payload stripper 330 from the server.

S72: The packet stripper may know if content contained in this packet is cached further down the network. If it is not, then the packet is forwarded unchanged S73 towards the client.

S74: If the content is cached, the payload is removed from the packet and replaced by a pointer which will identify where, in a file held by the cache, the data corresponding to the payload can be found. This results in a stripped-down packet. The stripped-down packet is modified to include a "fall-back" parameter in the header—i.e. a different source or destination port or protocol number, or IPv6 destination option identifier, as described above.

S75: The stripped-down packet is transmitted through the network towards the cache.

Figure 12:
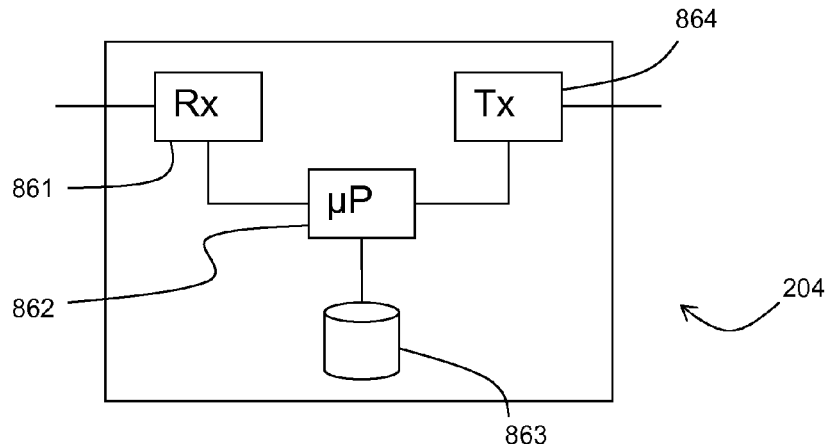
FIG. 12 is a schematic illustration of a cache.

FIG. 12 is a schematic illustration of a cache 204. The cache 204 includes a receiver 861 for receiving stripped-down packets from a payload stripper 330 or server 201. A storage medium 863 contains cached data. Each stripped-down packet contains a pointer identifying a file held in the storage medium 863, together with a location in the file and length of data. A processor 862 extracts the pointer from each stripped-down packet, identifies the relevant file and data in the storage medium 863, and inserts the data into the packet as a payload to generate a full size packet. A transmitter 864 transmits the full size packet towards a client.

Figure 13:
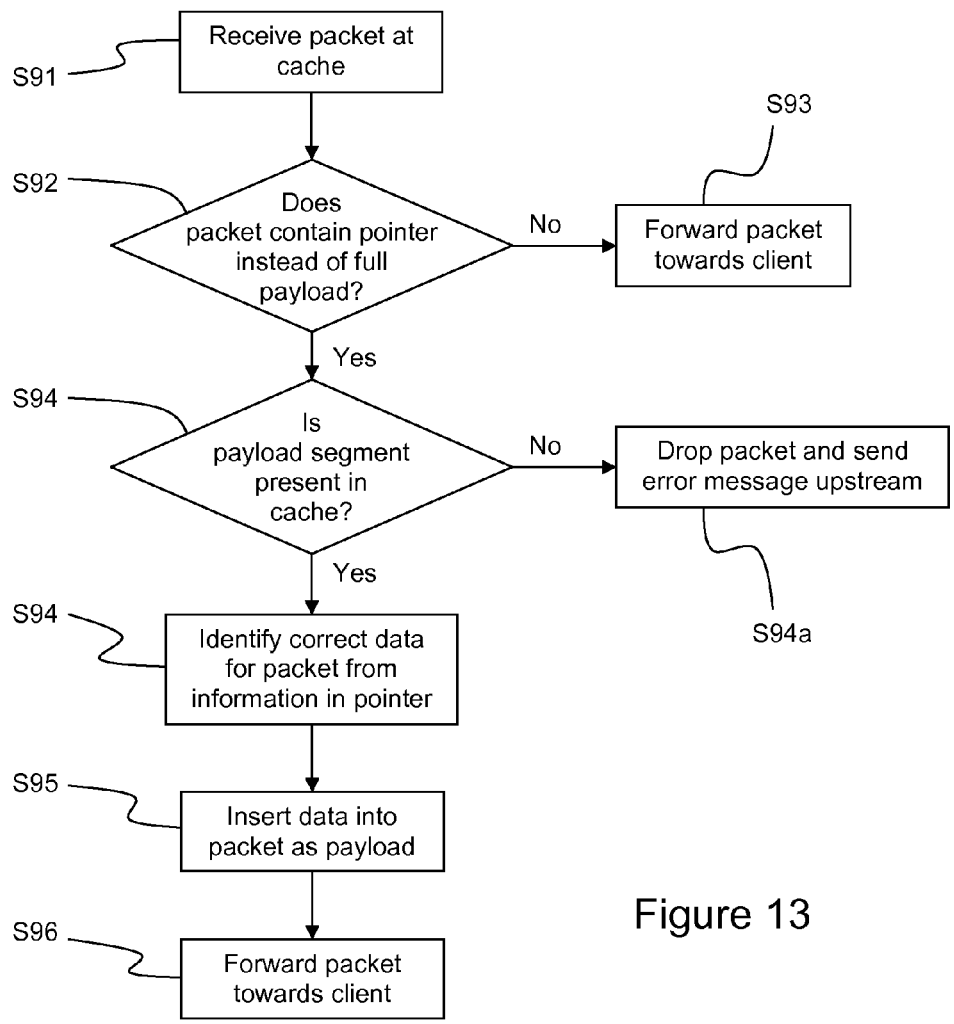
FIG. 13 is a flow chart illustrating actions carried out by a cache.

FIG. 13 is a flow diagram illustrating the operation of the cache 204.

S91: A packet is received at the cache.

S92: The packet is checked (either by DPI or by a search for a marker in the header) to determine if it contains a full payload, or is a stripped-down packet containing pointer information identifying payload data.

S93: If the packet contains a full payload it is forwarded unchanged towards the client.

S94: If it is a stripped-down packet, the cache storage medium is checked to see if the payload data identified by the pointer is present.

S94a: If the payload data is not present, the packet is dropped and an error message sent upstream.

S95: If the payload data is present, it is inserted into the packet as a payload, replacing the pointer, to generate a full size packet.

S96: The full size packet is sent into the network towards the client.

Figure 14:
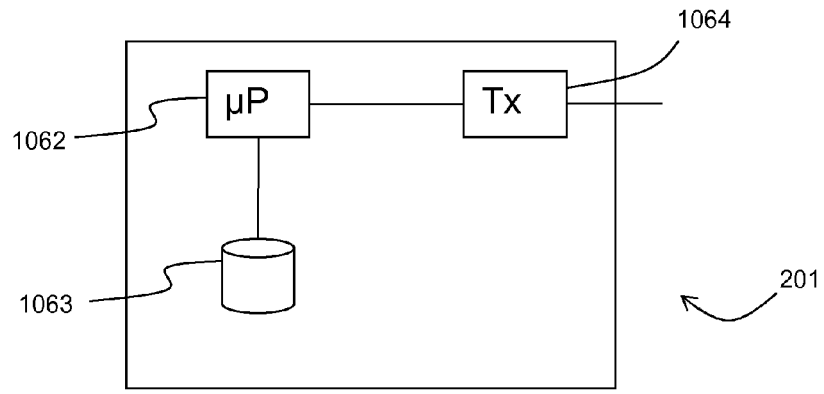
FIG. 14 is a schematic illustration of a server.

FIG. 14 is a schematic illustration of a server 201. The server 201 includes a processor 1062, storage medium 1063 and transmitter 1064. Stripped-down packets are generated by the processor 1062, each packet containing in its payload a pointer to a location in a file held by a cache 204 (as shown in FIG. 3). The storage medium 1063 may contain records of the files held by the cache to enable the processor 1062 to determine the information which should be encoded in the pointer. The transmitter 1064 forwards the packets towards a cache.

Figure 15:
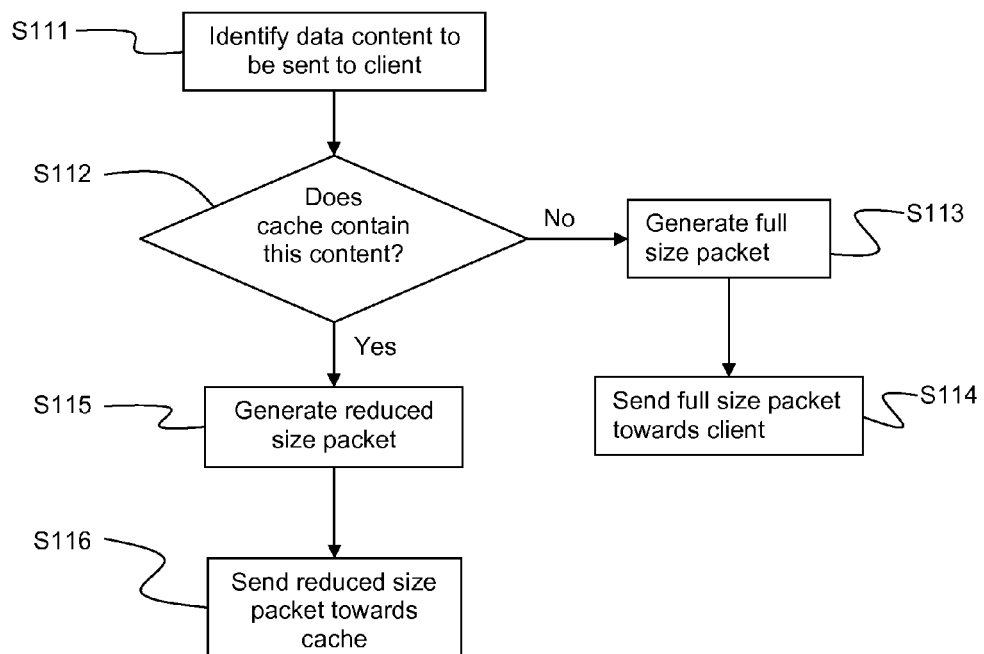
FIG. 15 is a flow chart illustrating actions carried out by a server.

FIG. 15 is a flow diagram illustrating how a packet is created and forwarded by the server 201.

S111: Content to be sent towards the client is identified.

S112: The server may know if this content is cached further down the network. If it is not, then a full size packet is generated S113 and forwarded S114 towards the client.

S115: If the content is cached, a stripped-down packet is generated. The payload of the stripped-down packet is replaced by a pointer which will identify where, in a file held by the cache, the data corresponding to the payload can be found. The stripped-down packet also includes a "fall-back" parameter in the header—i.e. a different source or destination port or protocol number, or IPv6 destination option identifier, as described above.

S116: The stripped-down packet is transmitted through the network towards the cache.

As has been explained above, the benefit of caching in any network is to limit the amount of network traffic, making it possible to replace network investment costs (which are expensive) with storage investment costs (which are relatively cheap). By further splitting application logic and state from simple payload data it is possible to make the caches application agnostic. This makes it possible to use the same caching infrastructure for several different applications such as RTSP streaming and HTTP- or P2P download. Since the cache is simple and lacks complicated logic it can be made robust and fault free. In this way it can more or less be seen as a piece of hardware (in fact, it can be implemented in hardware) that can be replaced and restarted by unqualified personnel. Furthermore, for systems where a user can switch end point during the life-time of a session, this can be done in a much simpler manner as no session state needs to be migrated between caches. Session state is always kept where it is handled best—in the content server (or an application-aware payload stripper).

The fall-back mechanism has the benefit that the caching system may work in a heterogeneous environment, i.e. network paths may exist to end nodes with or without a distributed cache on the path. This provides the possibility of gradual introduction of the cache system into the network, as bottlenecks in different parts of the backhaul are detected. In addition, it also provide the possibility of the use of lower-availability and thus low-cost devices for caching and longer inter-maintenance periods for caching. Additionally, the proposed mechanism also enables simple and effective identification of stripped packets to be processed by caches. Thus, it reduces the processing capacity requirement of the DPI functionality of the cache.

The invention claimed is:

1. A cache for use in a packet data network, comprising:
 a receiver for receiving a packet from an upstream node, the packet including transport and application headers and a payload;
 a storage medium for storing cached data;
 a processor operatively connected to the receiver and storage medium, the processor configured to:
  determine whether the packet comprises a stripped-down packet in which the payload thereof contains pointer information identifying a payload data segment;
  if so, determine whether the payload data segment is stored in the storage medium; and
  if so, use the pointer information to locate and retrieve the payload data segment from the storage medium, insert the retrieved payload data segment into the payload of the packet, and remove a fall-back parameter from the packet header and replace it with a correct value retrieved from the pointer information, the fall-back parameter designed to cause the client node to return an error message if the stripped-down packet reaches the client node; and
 a transmitter operatively connected to the processor for forwarding the packet towards a client.

2. The cache of claim 1, wherein the processor is further configured to test all packets received from the upstream node to determine if they include the fall-back parameter.

3. The cache of claim 1, wherein the fall-back parameter comprises one of:
 a destination port;
 a source port;
 a protocol value; and
 an IPv6 Destination Option type with its highest bits set to "10" or "11".

4. A payload stripper unit for use in a packet data network, the payload stripper unit comprising:
 a receiver for receiving a packet, the packet including transport and application headers and a payload;
 a processor operatively connected to the receiver and configured to remove a payload data segment from the payload of the packet and insert pointer information into the packet so as to generate a stripped-down packet, the pointer information for enabling a cache downstream of the payload stripper unit to identify the payload data segment from the data held by the cache, and insert a fall-back parameter into a header of the stripped-down packet, the fall-back parameter chosen so that, if the stripped-down packet reaches the client node, it will indicate to the client node to return an error message without forwarding the stripped down packet to a client application; and
 a transmitter operatively connected to the processor for forwarding the stripped-down packet towards the cache.

5. The payload stripper unit of claim 4, wherein the fall-back parameter comprises one of:
 a destination port;
 a source port;
 a protocol value; and
 an IPv6 Destination Option type with its highest bits set to "10" or "11".

6. The payload stripper unit of claim 4, wherein the receiver is further configured to receive error messages from a downstream client node or cache, in response to which the processor is configured to stop removing payload data segments from packets intended to be sent towards that client node or cache.

7. A system for transmitting data through one or more packet data networks comprising a packet sending node and a cache node, the packet sending node configured to:
 send a stripped-down packet including transport and application headers and a payload towards the cache node or a client node, the stripped-down packet including in its payload a pointer to a payload data segment stored in a file at the cache node, and insert a fall-back parameter into a header of the stripped-down packet; and
 the cache node configured to:
 receive the stripped-down packet;
 use the pointer to identify the payload data segment from data stored at the cache node;
 insert the payload data segment into the stripped-down packet in place of the pointer so as to generate a full size packet; and
 replace the fall-back parameter with a correct value when the full size packet is generated;
 send the full size packet towards a client; and
 the fall-back parameter causes the client to return an error message if the stripped-down packet reaches the client.

8. The method of claim 7, further comprising:
 inserting a fall-back parameter into a header of the stripped-down packet at the packet sending node;
 replacing the fall-back parameter with a correct value when the full size packet is generated at the cache node; and causing the client to return an error message responsive to the fall-back parameter if the stripped-down packet reaches the client.

9. The method of claim 8, wherein the fall-back parameter is recognized by the cache, the method further comprising returning an error message if the payload data segment referred to by the pointer in the stripped-down packet is not cached.

\* \* \* \* \*